United States Patent
Kim et al.

(10) Patent No.: US 9,687,741 B1
(45) Date of Patent: Jun. 27, 2017

(54) SYSTEM AND METHOD FOR PROVIDING SEPARATE DRIFT AND STEERING CONTROLS

(71) Applicant: KABAM, INC., San Francisco, CA (US)

(72) Inventors: William Kim, Vancouver (CA); Steven Pastro, Vancouver (CA); Christopher Ko, Vancouver (CA)

(73) Assignee: Kabam, Inc., San Francisco, CA (US)

( * ) Notice: Subject to any disclaimer, the term of this patent is extended or adjusted under 35 U.S.C. 154(b) by 224 days.

(21) Appl. No.: 14/644,161

(22) Filed: Mar. 10, 2015

(51) Int. Cl.
  G06F 3/01 (2006.01)
  A63F 13/5375 (2014.01)
  A63F 13/2145 (2014.01)
  A63F 13/803 (2014.01)

(52) U.S. Cl.
  CPC ...... *A63F 13/5375* (2014.09); *A63F 13/2145* (2014.09); *A63F 13/803* (2014.09)

(58) Field of Classification Search
  CPC .......... A63F 13/21; A63F 13/22; A63F 13/57; A63F 13/235; A63F 13/428; G06F 3/01
  See application file for complete search history.

(56) References Cited

U.S. PATENT DOCUMENTS

| | | | |
|---|---|---|---|
| 7,297,056 B2 | 11/2007 | Takahashi et al. | 463/3 |
| 7,658,675 B2 | 2/2010 | Hotta | 463/37 |
| 2005/0119051 A1 | 6/2005 | Ko | 463/37 |
| 2010/0203933 A1 | 8/2010 | Eyzaguirre et al. | 463/2 |
| 2010/0248836 A1 | 9/2010 | Suzuki et al. | 463/36 |
| 2013/0130801 A1 | 5/2013 | Haswell et al. | 463/37 |
| 2013/0244741 A1 | 9/2013 | Baynes et al. | 463/6 |

FOREIGN PATENT DOCUMENTS

WO  WO 2012/026936  3/2012

OTHER PUBLICATIONS

Drift Mania: Street Outlaws Android Gameplay | Android App Review, Feb. 15, 2014, https://www.youtube.com/watch?v=BzPzyjM8h3U.*
NFS Shift 2 Unleashed Drift Gameplay + Replay 4WD Drift with Nissan R34 Skyline GTR on London , Uploaded on Apr. 10, 2011, https://www.youtube.com/watch?v=T-r1y4917ds.*

* cited by examiner

*Primary Examiner* — James S McClellan
*Assistant Examiner* — Kevin Carter
(74) *Attorney, Agent, or Firm* — Sheppard Mullin Richter & Hampton LLP

(57) ABSTRACT

One aspect of the disclosure relates to providing a drift in a game played on a computing platform with a touch-sensitive interface. In some implementations, the system may facilitate a drift input control. In some implementations, the drift input control may be the player tapping the touch-sensitive surface. The drift may depend on one or more parameters (e.g., the speed, the pressure, and/or other parameters) of the tapping on the touch-sensitive surface.

20 Claims, 6 Drawing Sheets

SYSTEM AND METHOD FOR PROVIDING SEPARATE DRIFT AND STEERING CONTROLS

FIELD OF THE DISCLOSURE

This disclosure relates to providing game controls that enable a player to control a drift quality of a moving object in a mobile game.

BACKGROUND

In traditional racing or action games, typically steering controls enable a player to control a direction of a moving object (e.g., a car, a spaceship, etc.). Furthermore, the quality (e.g., amount of control) of drift by the moving object depends on player performance in steering the moving object through the steering controls and is not separately controllable.

SUMMARY

One aspect of the disclosure relates to providing a control mechanic for a user to control drift in a game played on a computing platform with a touch-sensitive surface. The game may take place within a virtual space. To control one or more aspects of drift, a user may tap the touch sensitive surface. One or more aspects of the drift may be varied as a function of one or more parameters (e.g., a speed, a pressure, and/or other parameter) of the tapping on the touch-sensitive surface and/or other input. Tapping may require contact with the touch-sensitive surface at or near a virtual button displayed on the touch-sensitive surface and/or a real button included with the computing platform. The user may vary a parameter of the tapping to keep a dial (or some other presented element) within a certain target range of a displayed meter in order for the moving virtual object to maintain one or more drift parameters when performing a maneuver. In some implementations, the quality of drift by the moving object is controlled by inputs received from the user, and/or other considerations. Other inputs for controlling the object may include one or more of tilting a computing platform (resulting in orientation sensor readings, accelerometer readings, and/or other considerations), a finger swipe (resulting in displacement readings), and/or any other types of user inputs.

A system configured for providing game controls to enable a user to control drift of a moving object in a mobile game may include a server. The server may operate in a client/server architecture with one or more client computing platforms. The client computing platforms may be associated with the users of the game. The server may be configured to execute one or more of: a space component, a user component, a steering component, a drift component, a network component, a player interface component, and/or other components.

The space component may be configured to effectuate presentation of a view of a virtual space to a first user and/or other users. The space component may facilitate participation of users in a game taking place in the virtual space. Participation may include users controlling the motion of game entities within the virtual space. The first user may control the motion of a first game entity in the virtual space during participation in the game.

The user component may be configured to access and/or manage user information associated with the users of the virtual space who participate in the game that takes place in the virtual space. The user information may include one or more user accounts associated with individual users. The one or more user accounts may contain user parameters associated with the individual users. The set of parameters may include parameters reflecting the individual users' progressions in the game, parameters indicating various statistics about content that have been amassed by the users in the game, parameters indicating various statistics about the users' performances in competitions, parameters indicating various statistics about relationships achieved by a given user in and/or outside of the game, and/or any other user and/or player parameters. The user accounts managed by the user component may include a first user account associated with the first user. The first user account may include a first set of user parameters associated with the first user and/or any other user of the game and/or the virtual space.

The steering component may be configured to receive entry and/or a selection of steering control inputs from the first user and/or other users. The steering component may be configured to effectuate control of the first game entity to perform a maneuver within the virtual space (e.g., turn from side to side and/or other considerations) in accordance with the received steering control inputs and/or any other inputs. The steering control input may comprise one or more of tilting the client computing platform, finger swiping on the touch-sensitive surface, tapping the touch-sensitive surface, pressing a button on the client computing platform, and/or any other considerations of user input. A throttle control input may comprise one or more of tilting the client computing platform, tapping the touch-sensitive surface, finger swiping on the touch-sensitive surface, pressing a button on the client computing platform, and/or any other considerations of user input.

The drift component may be configured to effectuate control of the first game entity and/or other game entities to perform a drift maneuver within the virtual space (e.g., drift from side to side and/or other considerations) in accordance with drift control inputs received from the first user and/or any other users. The drift control inputs may be input by the first user by tapping on a touch sensitive surface and/or by other techniques. The drift component may be configured such that one or more aspects of the drifting maneuver of the first game entity at a given point in time may be determined based on one or more parameters of a tapping by the first user (or other input) on the touch sensitive surface at the given point in time, over a time interval, and/or other considerations.

The drift component may be configured such that the one or more aspects of the drifting maneuver of the first game entity may be determined based on the speed (or other parameter) of the tapping by the first user on the touch-sensitive surface. By way of non-limiting illustration, the speed or other parameter of a tapping may effectuate a rate of lateral motion of at least a portion of the first game entity during a drift and/or during any other maneuver.

In some implementations, the first game entity may be a virtual motorized vehicle and/or other virtual object. The drift component may be configured such that the one or more aspects of the drifting of the first game entity determined based on one or more parameters of a tapping or other input of the first user may impact an influence of simulated friction between a wheel of the motorized vehicle and a simulated surface across which the wheel is travelling during a drift, and/or other considerations. In some implementations, a threshold range above a minimum tapping or other input threshold and/or below a maximum tapping or other input threshold may provide a maximum (or target) drift control.

The player interface component may be configured to effectuate display of a range representative of one or more parameters of user input. The display may provide an indication or other graphical representation of a present state of individual ones of the one or more parameters associated with the user input. The indicator or other graphic may be configured to display different colors representing the range and threshold input parameter(s). The indicator may display messages to the user relating to the drift control inputs and/or any other inputs.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular forms of "a", "an", and "the" include plural referents unless the context clearly dictates otherwise.

DETAILED DESCRIPTION

Figure 1:
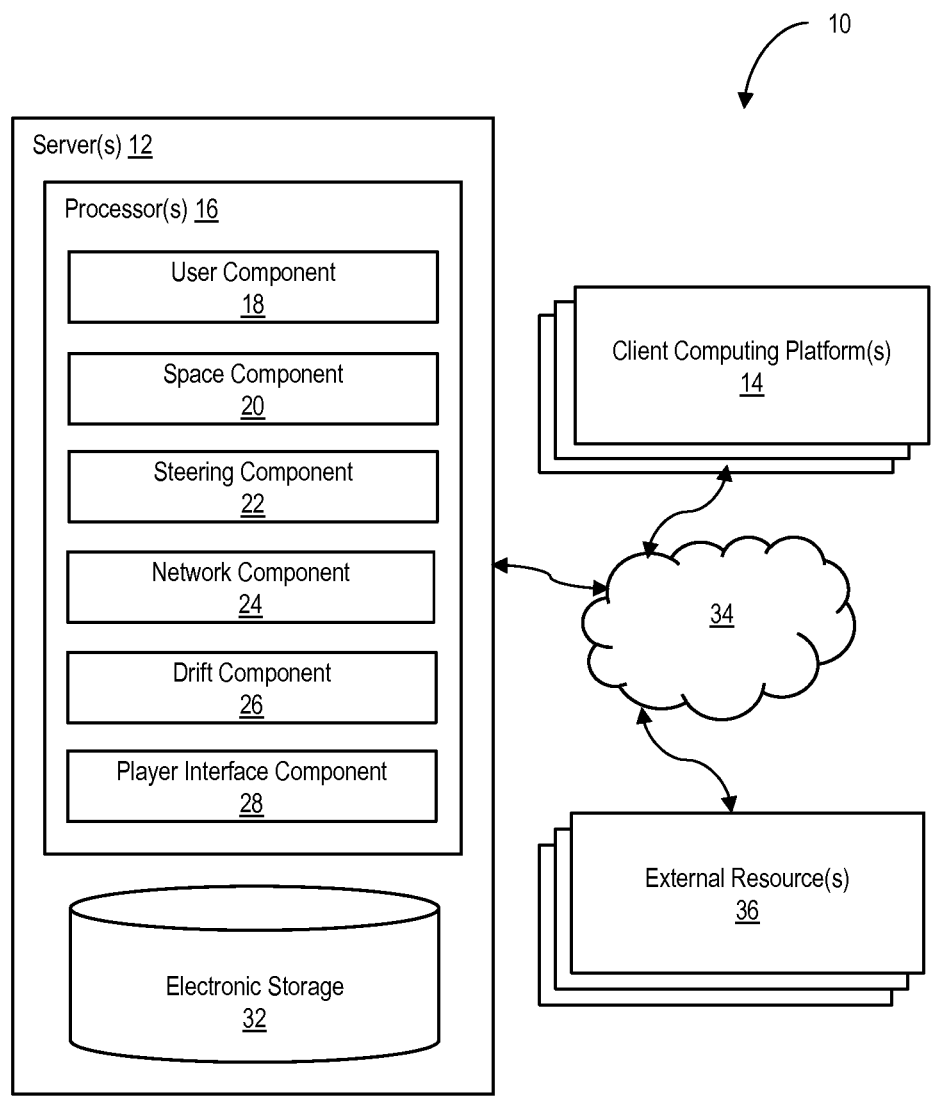
FIG. 1 illustrates a system configured to provide separate drift and steering controls in a game, in accordance with one or more implementations.

FIG. 1 illustrates a system 10 configured for providing a driving game mechanic in a virtual space. One or more games may take place within the virtual space. The users may participate in the virtual space and/or game by controlling game entities within the virtual space. Game entities may include one or more of a virtual character, a group of characters, a virtual object, and/or other considerations. The virtual space and/or game taking place within the virtual space may be associated with virtual objects that impact virtual resource balances, in accordance with an aspect of the invention.

In some implementations, system 10 may include a server(s) 12. The server(s) 12 may be a game server. The server(s) 12 may host the virtual space in which one or more games take place. The server(s) 12 may be configured to communicate with one or more client computing platform(s) 14 in accordance with client/server architecture. The users may access system 10 and/or the virtual space via client computing platform(s) 14. Herein, the term "players" may refer to users of the system who participate in a game that takes place within the virtual space.

The server(s) 12 may be configured to execute one or more computer program components. The computer program components may include one or more of a user component 18, a space component 20, a steering component 22, a network component 24, a drift component 26, a player interface component 28, and/or any other components.

The user component 18 may be configured to store inventories of virtual items that may be available to users in the virtual space. The inventories may include a first inventory and/or any other inventory of virtual items available to a first user of the virtual space.

The user component 18 may be configured to access and/or manage one or more user profiles and/or user information associated with users of the system 10. The user component 18 may include, for example, user information and/or user profiles associated with the users of a game that takes place in the virtual space. The one or more user profiles and/or user information may include information stored by server(s) 12, one or more of the client computing platform(s) 14, and/or other storage locations. The user profiles may include, for example, information identifying users (e.g., a user name or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a client computing platform identification associated with a user, a phone number associated with a user, and/or other information related to users.

The user component 18 may be configured to access and/or manage one or more user accounts associated with individual users of the virtual space. The one or more user accounts may contain gameplay parameters associated with the individual users. The set of parameters may include parameters reflecting the individual users' progressions in the game, parameters indicating various statistics about content that have been amassed by the users in the game, parameters indicating various statistics about the users' performances in competitions, parameters indicating various statistics about relationships achieved by a given user in and/or outside of the game, and/or any other gameplay parameters. The user accounts managed by the user component 18 may include a first user account associated with a first user of the game. The first user account may include a first set of parameters and/or other information associated with the first user and/or any other user of the game.

The user component 18 may be configured to store inventories of virtual items, including resources that may be available to users in the virtual space. Information associated with the users may be stored by or collected in an inventory. This information may include, but is not limited to, virtual items, virtual resources, game entity attributes, game entity skills, and/or virtual currency associated with the individual users. The users may be individually associated with one or more inventories. A given inventory may be accessed through an interface. As a game entity progresses through the game, the user may receive access to higher-level items, higher-valued items, and/or other considerations. Higher-level and/or -valued items may be more powerful and/or effective within the game. This may include having parameters (e.g., hit points, attack strength, defense points, speed, etc.) that enhance the functionality of the items in the virtual space and/or game. The users may be able to review items within a user inventory and equip a game entity with an item appropriate to the current game situation. Items may be viewed from the inventory in a preview window. As items are selected, they may appear either on or next to the game entity. For example, if a game entity is currently not building and/or researching anything, a building may be built and/or research may be started by accessing the game entity's inventory and utilizing virtual items. Users may collect, trade, buy, fight over items, and/or perform other actions to add to their inventories. Games in different genres, such as science fiction, may incorporate items specific to that genre. For example, laser guns may be substituted in place of swords as the standard weapon used by game entities within a science fiction-type game, and/or other considerations. The information describing clothing and other equipment or gear may be stored in a game entity record.

Users of the virtual space and/or game may acquire virtual currency, which may be reflected in the user profiles. In some implementations, the virtual currency may be represented by virtual coins, virtual cash, and/or by a number or value stored by the server for that user's benefit. Virtual currency may represent units of value for use as consideration in transactions in the virtual space and/or game, and/or may be analogous to legal currency. Virtual currency can be purchased with real money consideration. Such purchases may be made with cash or credit denominated in real money or with another virtual currency previously purchased by a user with real money (e.g., Facebook credits, Bitcoins, and/or other virtual currency). A user may earn virtual currency by taking action in a game. By way of non-limiting example, a user may be rewarded with one or more units of virtual currency after completing a task, quest, challenge, and/or mission within the game, and/or other considerations. As another non-limiting example, a farming game may reward a given number of gold coins (and/or other currency) each time a virtual crop is harvested (and/or other game action is taken).

Virtual currency may be used to purchase one or more in-game assets and/or benefits, such as a virtual item and/or good, a game entity, and/or other considerations. A user may exchange virtual currency for a desired level, access, right, and/or item in a game, and/or other considerations. In some implementations, legal currency may be used to directly purchase an in-game asset and/or other considerations.

In some implementations, multiple types of virtual currency may be available for purchase and/or acquisition. By way of non-limiting example, a given game may have virtual gold coins, virtual cash, and/or other considerations. The different types of virtual currency may have different exchange rates with respect to legal currency and each other. By way of non-limiting example, a user may exchange $1 in legal currency for either 100 virtual gold coins or $2 in virtual cash; however, virtual gold coins may or may not be exchanged for virtual cash, and/or other considerations. Similarly, where in-game assets and other benefits may be purchased with virtual currency, they may have different exchange rates with respect to the different types of virtual currency. By way of non-limiting example, a user may buy a virtual business object for $10 in virtual cash but may or may not purchase the virtual business object for virtual gold coins alone. In some implementations, certain types of virtual currency may be acquired by engaging in various in-game actions, while other types of virtual currency may be acquired by exchanging legal currency, and/or other considerations. By way of non-limiting example, a user may be able to acquire virtual gold coins by selling virtual goods in a business, may acquire virtual cash by exchanging legal currency, and/or other considerations. Virtual cash may be awarded for leveling-up in the game, and/or other considerations.

The space component 20 may be configured to execute an instance of a virtual space. The instance of the virtual space may include a game taking place within the virtual space. The instance of the virtual space may be used to facilitate presentation of views of the virtual space to users. The instance of the virtual space may be executed to facilitate user participation within the virtual space. User participation may include interaction between users of the game, users performing operations in the game instance in response to commands and/or any other input received from the users, and/or other considerations.

The space component 20 may be configured to implement the instance of the virtual space to facilitate presentation of the virtual space and/or game taking place within the virtual space to users on client computing platforms. The presentation may facilitate participation of the users in the game through the reception of commands from the users through the client computing platforms and/or any other platforms.

The space component 20 may be configured to effectuate presentation of a view of a virtual space to a first user. The space component 20 may be configured to facilitate participation of one or more users in a racing game taking place within the virtual space and/or other considerations of a game that may take place within the virtual space. By way of non-limiting illustration, in a racing game the first user may control the motion of a first game entity (e.g., maneuver the first game entity) during participation in the racing game and/or any other game.

The space component 20 may be configured to implement the instance of the virtual space executed by the computer components to determine state of the virtual space. The state may then be communicated (e.g., via streaming visual data, object/position data, and/or other state information) from server(s) 12 to client computing platform(s) 14 for presentation to users. The state determined and transmitted to a given client computing platform(s) 14 may correspond to a view for a game entity being controlled by a user via the given client computing platform(s) 14. The state determined and transmitted to a given client computing platform(s) 14 may correspond to a location in the virtual space. The view described by the state for the given client computing platform may correspond, for example, to the location from which the view is taken, the location the view depicts and/or other locations, a zoom ratio, a dimensionality of objects, a point-of-view, and/or view parameters of the view. One or more of the view parameters may be selectable by the user. The instance of the virtual space and/or the game that takes place therein may be persistent. That is, the virtual space and/or the game may continue on whether or not individual users are currently logged in and/or participating in the game. A user who logs out of the virtual space and then logs back in some time later may find the virtual space has been changed through the interactions of other users with the virtual space during the time the user was logged out. These changes may include changes to the simulated physical space, changes in the user's inventory, changes in other users' inventories, changes experienced by non-player characters, and/or other changes.

The instance of the virtual space may comprise a simulated space that is accessible by users via clients (e.g., client computing platform(s) 14) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer components may be synchronous, asynchronous, and/or semi-synchronous.

The above description of the manner in which state of the virtual space is determined by space component 20 is not intended to be limiting. The space component 20 may be configured to express the virtual space in a more limited, or more rich, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space component 20, users may control game entities, objects, simulated physical phenomena (e.g., wind, rain, earthquakes, and/or other phenomena), and/or other elements within the virtual space to interact with the virtual space and/or each other. The game entities may include avatars. As used herein, the term game entity may refer to an object (or group of objects) present in the virtual space that represents an individual user. A given game entity may be controlled by the user with which it is associated. The user-controlled element(s) may move through and interact with the virtual space (e.g., non-player characters in the virtual space and/or other objects in the virtual space). The user-controlled elements controlled by and/or associated with a given user may be created and/or customized by the given user. The user may have an "inventory" of virtual goods and/or currency that the user can use (e.g., by manipulation of a game entity or other user-controlled element, and/or other items) within the virtual space.

The users may participate in the instance of the virtual space by controlling one or more of the available user-controlled elements in the virtual space. Control may be exercised through control inputs and/or commands input by the users through client computing platform(s) 14. The users may interact with each other through communications exchanged within the virtual space. Such communications may include one or more of textual chat, instant messages, private messages, voice communications, and/or other communications. Communications may be received and entered by the users via their respective client computing platforms 14. Communications may be routed to and from the appropriate users through server(s) 12 (e.g., through space component 20).

The space component 20 may be configured such that participation in a game by users may require expenditure by the users of a virtual resource and/or any other in-game resource, and/or other considerations. In some implementations, the space component 20 may be configured such that the game is a turn-based game in which a cost for providing turns to the users is a finite number of units of a virtual resource. In some implementations, the provision of a turn to the first user may require a subtraction of the finite number of units of the virtual resource from a first resource balance associated with the first user. The virtual resource may include, but is not limited to, energy, virtual items, a game entity attribute or a level of a game entity attribute, a game entity skill or a level of a game entity skill, and/or other resources. References herein to one of these examples (e.g., "energy," "fuel," and/or other examples) are not restrictive but merely illustrative, and the principles described using any such example may apply to other examples of the virtual resource. Energy may be adding fuel to a vehicle, powering-up a virtual game entity, and/or any other in-game power source to a virtual world. A virtual item may be an item that can be used in a virtual world to assist a user's game entity. Examples of virtual items include, but are not limited to, valuables (money, valuable metals or gems, etc.), weapons, spell components, defense components, and/or armor.

A virtual resource may be a resource that may be used in the virtual space to create game attributes. A game entity attribute may be any quality, trait, feature, and/or characteristic a particular game entity may have. Game entity attributes may include, but not be limited to, a game entity score, a virtual object, the physical appearance of a game entity, an emblem or mark, a synthetic voice, virtual currency, virtual help points or credits, the ability to join groups of other users at a later time, a score for subsequent matching of later game parameters, a relationship with another game entity, a genetic profile or makeup, a skill or skill level, and/or a ranking. Game entity skills may be game attributes inherent in or acquired by a game entity during game play, such as, but not limited to, the ability to cast (certain) spells, foretell the future, read minds, use (certain) weapons, cook, hunt, find herbs, assemble herbs into portions, mine, assemble objects into other objects, fly, and/or enchant other game entities.

The steering component 22 may be configured to receive entry and/or selection of steering control inputs from the first user and/or other users of the virtual space. The steering component 22 may be configured to effectuate control of the first game entity to maneuver in the virtual space in accordance with the received steering control inputs and/or any other inputs. For example, a maneuver may include a turn, a series of turns, a turn from side to side, and/or other considerations. The steering control input may comprise one or more of tilting the client computing platform, finger swiping on the touch-sensitive surface, pressing a button on the client computing platform, and/or any other input. A throttle control input may comprise one or more of tilting the client computing platform, finger swiping on the touch-sensitive surface, and/or pressing a button on the client computing platform, and/or any other input.

In some implementations, user input may comprise a haptic input mechanism configured to provide haptic feedback responsive to user input (e.g., a push, tap, and/or other considerations). In some implementations, the haptic input mechanism may be integrated with a touch-sensitive display of the client computing platforms, forming a surface of the haptic input mechanism. The touch-sensitive display may comprise a touch-sensing mechanism.

In some implementations, a touch-sensing mechanism may be configured to receive entry and/or selection of touch input from an appendage of a user such as a digit, an interactive instrument such as a stylus, and/or other suitable apparatus capable of interacting with the touch-sensing mechanism. The touch-sensing mechanism may be configured to generate output signals in accordance with the received entry and/or selection. The touch-sensing mechanism may be considered to "sense" the touch input of the user. In some implementations, a touch input may include direct contact with the touch-sensitive display, proximate movement near the touch-sensitive display, and/or other considerations. For example, a touch input may be performed via a sliding, tapping, etc. of a digit on a surface of the touch-sensitive display, and/or other considerations.

In some implementations, a first input may effectuate (e.g., trigger) a first operation performed by the client computing platform. In some implementations, a second input may effectuate a second operation performed by the client computing platform. Effectuating (e.g., triggering) an operation by the client computing platforms may include generating and/or sending command signals to one or more computer program components, implementing commanded actions by a computer program component executed by the client computing platform and/or server 12, activating one or more components, and/or other considerations.

The network component 24 may be configured to establish and/or maintain one or more connections between the server 12 and the one or more client computing platform(s) 14. For example, the network component 24 may maintain one or more communication lines or ports to enable connection and/or exchange of information with a network 34 and/or other computing platform(s) 14. Information such as state information, game state, game logic, and/or other information may be communicated via network component 24. The network component 24 may be configured to receive information from the client computing platform(s) 14.

The drift component 26 may be configured to effectuate control of the first game entity to perform a drift (e.g., maneuver from side to side) in accordance with drift control inputs received from the first user and/or any other user. The drift control inputs may be entered and/or received by the first user by tapping and/or by providing other input on a touch-sensitive surface and/or other input mechanism of a client computing platform 14. The drift component 26 may be configured such that one or more aspects of the drifting of the first game entity at a given point in time may be determined based on a parameter (e.g., speed, pressure, and/or other considerations) of the user input (e.g., tapping and/or other input) of the first user on the touch-sensitive surface (or other input mechanism) at the given point in time and/or any other time.

In some implementations, providing drift controls separate from steering controls in a game may enable users to control quality of a simulated drift performed by moving objects in the virtual space. In some implementations, drift control may be provided by a button (or other interface element) displayed in the virtual space along with an indicator indicating a dial in a meter. A user of the game may intermittently press the button to keep the dial within a certain target range of the meter in order for the moving object to have a target quality of drift when it is performing a maneuver. The quality of drift by the moving object may be controlled by a user pressing and/or tapping the button, and/or other considerations. By way of non-limiting example, the moving object may over drift when the dial indicates the user presses the button more frequently than a target frequency of input, and/or the moving object may drift under drift (e.g., drift too little) when the dial indicates the user may be pressing the button at a frequency that is less than the target frequency of input. Other user inputs for such drift control may include tilting a client computing platform 14 (resulting in orientation sensor readings being produced), finger swiping (resulting in displacement readings being produced), whack-a-mole type of button pressing (timing readings), and/or any other types of user inputs.

The drift component 26 may be configured such that the one or more aspects of the drifting of the first game entity may be determined based on the speed (e.g., frequency, pressure, and/or other parameters) of the tapping (and/or other input) of the first user on the touch-sensitive surface (and/or other input mechanism). By way of non-limiting example, a speed of tapping may effectuate control of a game entity to maneuver in accordance with a rate of lateral motion of at least a portion of the first game entity during a drift and/or during any other control operation.

In some implementations, the faster the user provides input, the better the drift may be controlled (e.g., providing a target drift maneuver). In some implementations, the more consistently the user provides the input, the better the drift may be controlled. In some implementations, the more accurately the user provides the input, the better the drift may be controlled. In some implementations, a combination of speed, consistency, accuracy, and/or other parameters may provide target drift controls.

In some implementations, the first game entity may be a motorized vehicle. The drift component 26 may be configured such that the one or more aspects of the drifting of the first game entity determined based on a speed (or other parameter) of the tapping (or other input) of the first user may impact an influence of simulated friction between a wheel of the motorized vehicle and a surface across which the wheel may be travelling during a drift. A threshold range above a minimum tapping (or other input) threshold and below a maximum tapping (or other input) threshold may provide a target drift control.

In some implementations, when a user provides an input within a threshold range, a better drift control may occur (e.g., the drift maneuver may more closely match a target drift maneuver). By way of non-limiting example, if a user presses a button at a medium speed and/or frequency, and/or presses the button accurately and/or consistently, a drift control that closely matches a target drift control may occur.

The player interface component 28 may be configured to effectuate display of a range representative of the speed (or other parameter) of the tapping (or other input) and/or may provide an indication of a present rate at which the user may be tapping and/or providing any other input (e.g., finger swiping and/or other considerations). The indicator may display different colors representing the range and/or threshold tapping (or other input) speeds. The indicator may display messages and/or other visual notifications to the user relating to the drift control inputs and/or other inputs.

In some implementations, visual notifications may include effectuating presentation of a display for messaging (e.g., a pop-up window, and/or other considerations), using one or more light sources, and/or other considerations. In some implementations, one or more visual notifications may concurrently or individually provide notification. In some implementations, the notification including one or more light sources may comprise one or more colors. In some implementations, the notification may comprise one or more light sources which may flash and/or illuminate in response to the drift control inputs. In some implementations, the notification including one or more light sources may concurrently or individually provide notification. In some implementations, the notification may include altering the color of one or more light sources displayed. In some implementations, the notification may include effectuating presentation of a message on a display.

The server(s) 12, client computing platform(s) 14, and/or external resource(s) 36 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 12, client computing platform(s) 14, and/or external resource(s) 36 may be operatively linked via some other communication media.

Server(s) 12 may include electronic storage 32, one or more processors 16, and/or other components. Server(s) 12 may include communication lines or ports to enable the exchange of information with a network 34 and/or other computing platform(s) 14. Illustration of server(s) 12 in FIG. 1 is not intended to be limiting. Server(s) 12 may include a plurality of hardware, software, and/or firmware components operating together to provide the functionality attributed herein to server(s) 12. For example, server(s) 12 may be implemented by a cloud of computing platforms operating together as server(s) 12.

Electronic storage 32 may comprise non-transitory storage media that electronically store information. The electronic storage media of electronic storage 32 may include one or both of system storage that is provided integrally (i.e., substantially non-removable) with server(s) 12 and/or removable storage that is removably connectable to server(s) 12 via, for example, a port (e.g., a USB port, a firewire port, etc.) or a drive (e.g., a disk drive, etc.). Electronic storage 32 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 32 may include one or more virtual storage resources (e.g., cloud storage, a virtual private network, and/or other virtual storage resources). Electronic storage 32 may store software algorithms, information determined by processor(s) 16, information received from server(s) 12, information received from client computing platform(s) 14, and/or other information that enables server(s) 12 to function as described herein.

Processor(s) 16 is configured to provide information-processing capabilities in server(s) 12. As such, processor(s) 16 may include one or more of a digital processor, an analog processor, a digital circuit designed to process information, an analog circuit designed to process information, a state machine, and/or other mechanisms for electronically processing information. Although processor(s) 16 is shown in FIG. 1 as a single entity, this is for illustrative purposes only. In some implementations, processor(s) 16 may include a plurality of processing units. These processing units may be physically located within the same device, or processor(s) 16 may represent processing functionality of a plurality of devices operating in coordination. The processor(s) 16 may be configured to execute components 18, 20, 22, 24, 26, and/or 28. Processor(s) 16 may be configured to execute components 18, 20, 22, 24, 26, and/or 28 by software; hardware; firmware; some combination of software, hardware, and/or firmware; and/or other mechanisms for configuring processing capabilities on processor(s) 16. As used herein, the term "component" may refer to any component or set of components that perform the functionality attributed to the component. This may include one or more physical processors during execution of processor-readable instructions, the processor-readable instructions, circuitry, hardware, storage media, or any other components.

It should be appreciated that, although components 18, 20, 22, 24, 26, and/or 28 are illustrated in FIG. 1 as being implemented within a single processing unit, in implementations in which the processor includes multiple processing units, one or more of components 18, 20, 22, 24, 26, and/or 28 may be implemented remotely from the other components. The description of the functionality provided by the different components 18, 20, 22, 24, 26, and/or 28 described below is for illustrative purposes and is not intended to be limiting, as any of components 18, 20, 22, 24, 26, and/or 28 may provide more or less functionality than is described. For example, one or more of components 18, 20, 22, 24, 26, and/or 28 may be eliminated, and some or all of its functionality may be provided by other ones of components 18, 20, 22, 24, 26, and/or 28. As another example, processor(s) 16 may be configured to execute one or more additional components that may perform some or all of the functionality attributed below to one of components 18, 20, 22, 24, 26, and/or 28.

A given client computing platform(s) 14 may include one or more processors configured to execute computer program components. The computer program components may be configured to enable an expert or player associated with the given client computing platform(s) 14 to interface with system 10, server(s) 12, and/or external resource(s) 36, and/or provide other functionality attributed herein to client computing platform(s) 14. By way of non-limiting example, the given client computing platform(s) 14 may include one or more of a desktop computer, a laptop computer, a handheld computer, a tablet computing platform, a NetBook, a Smartphone, a gaming console, and/or other computing platforms.

External resource(s) 36 may include sources of information, hosts and/or providers of virtual spaces outside of system 10, external entities participating with system 10, and/or other resources. In some implementations, some or all of the functionality attributed herein to external resource(s) 36 may be provided by resources included in system 10.

Figure 2:
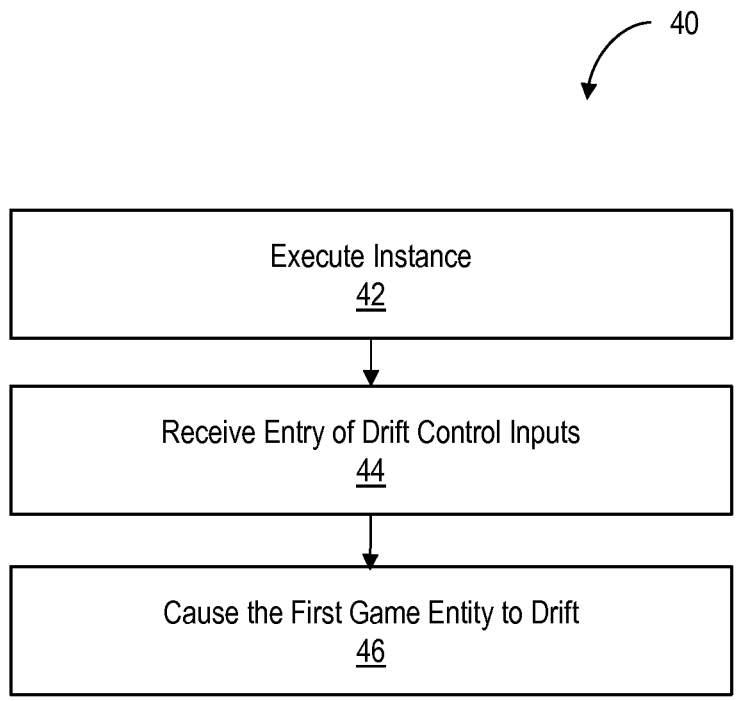
FIG. 2 illustrates a method of providing separate drift and steering controls in a game, in accordance with one or more implementations.

FIG. 2 illustrates an exemplary method 40 of providing separate drift and steering controls in a game, in accordance with an aspect of the invention. The operations of method 40 presented below are intended to be illustrative. In some embodiments, method 40 may be accomplished with one or more additional operations not described, and/or without one or more of the operations discussed. The order in which the operations of method 40 are illustrated in FIG. 2 and described below is not intended to be limiting.

In some embodiments, method 40 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 40 in response to instructions stored electronically on an electronic storage medium. The one or more processing devices may include one or more devices configured through hardware, firmware, and/or software to be specifically designed for execution of one or more of the operations of method 40.

At an operation 42, an instance of a virtual space may be executed. In some implementations, operation 42 may be performed by a space component the same as or similar to space component 20 (shown in FIG. 1 and described above).

At an operation 44, the executed instance of the virtual space may receive entry of drift control inputs. In some implementations, operation 44 may be performed by a drift component the same as or similar to drift component 26 (shown in FIG. 1 and described above).

At an operation 46, the first game entity may drift in the game. In some implementations, operation 46 may be performed by a drift component the same as or similar to drift component 26 (shown in FIG. 1 and described above).

Figure 3:
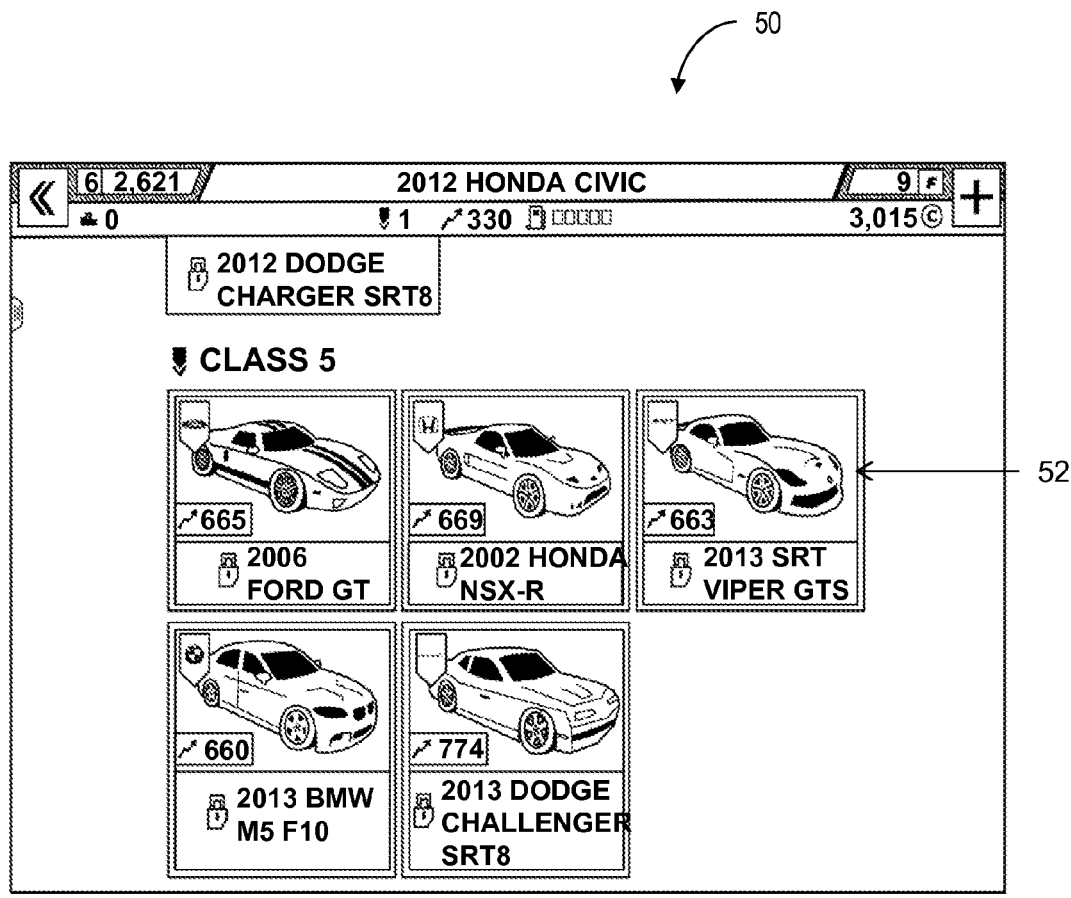
FIG. 3 illustrates a diagram of a player interface which provides separate drift and steering controls in a game, in accordance with one or more implementations.

FIG. 3 illustrates an exemplary diagram of a player interface 50 which provides separate drift and steering controls in a game, in accordance with an aspect of the invention. In some implementations, the players may be presented the options 52 to select which vehicle they want to use in the game.

Figure 4:
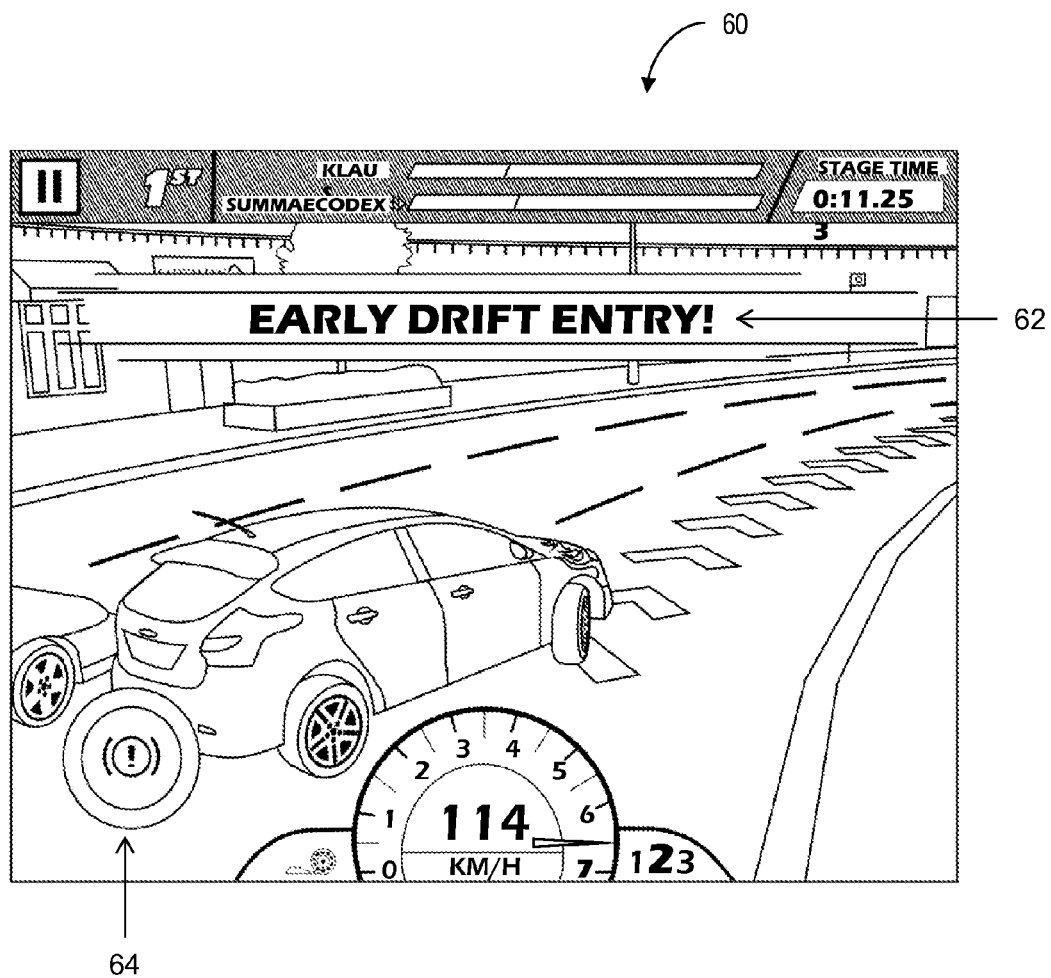
FIG. 4 illustrates a diagram of a player interface which provides separate drift and steering controls in a game, in accordance with one or more implementations.

FIG. 4 illustrates an exemplary diagram of a player interface 60 which provides separate drift and steering controls in a game, in accordance with an aspect of the invention. In some implementations, the player may receive a notification 62 of the accuracy of their input. In some implementations, the player may provide drift control inputs by tapping on a button 64.

Figure 5:
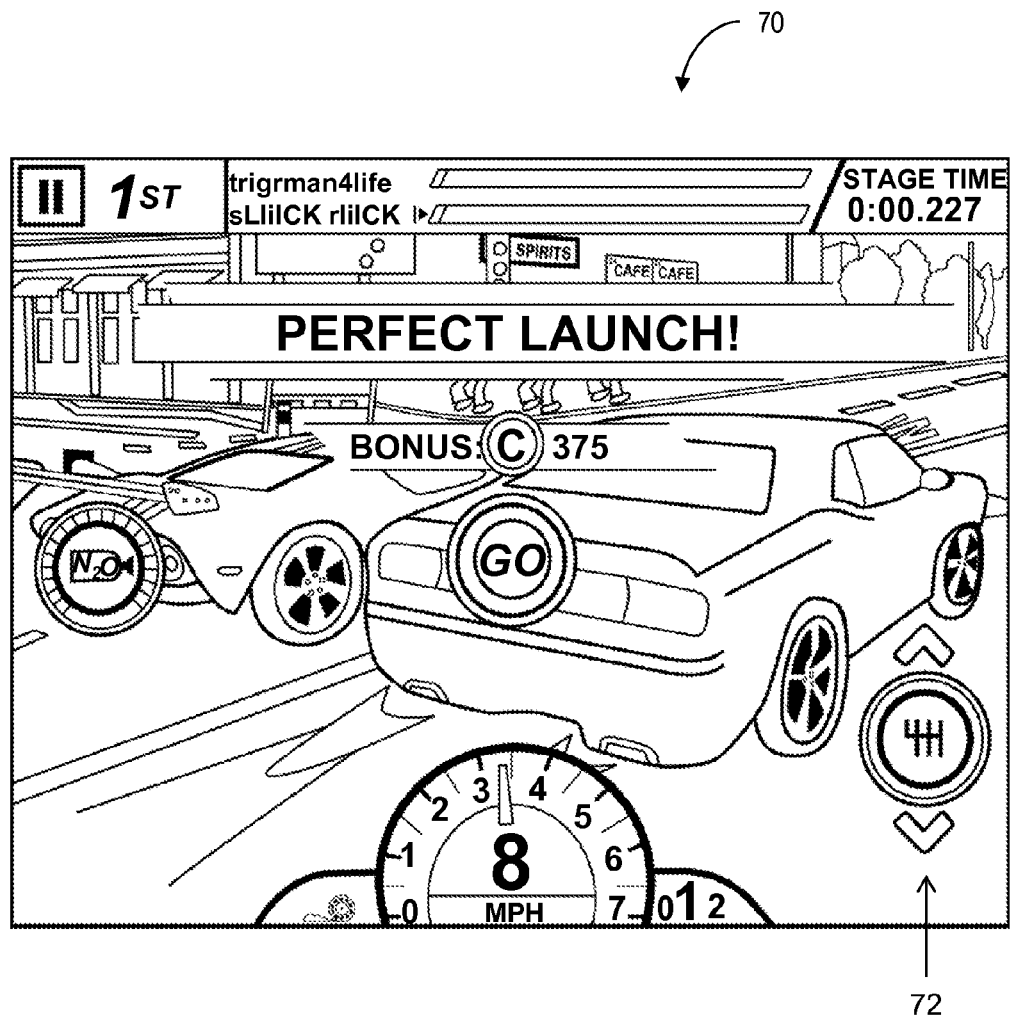
FIG. 5 illustrates a diagram of a player interface which provides separate drift and steering controls in a game, in accordance with one or more implementations.

FIG. 5 illustrates an exemplary diagram of a player interface 70 which provides separate drift and steering controls in a game, in accordance with an aspect of the invention. In some implementations, the steering controls 72 may be displayed on the player interface.

Figure 6:
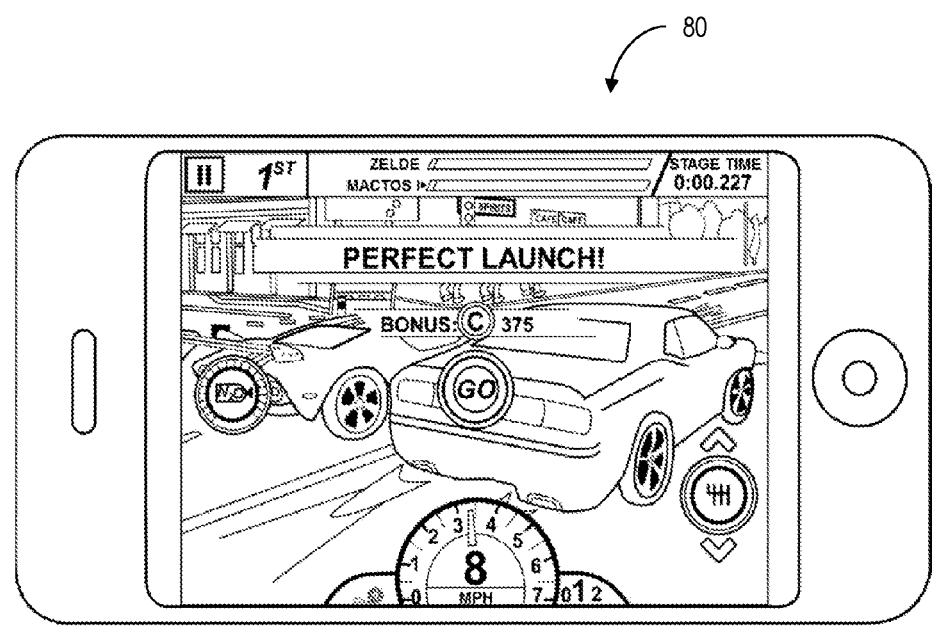
FIG. 6 illustrates a diagram of a player interface which provides separate drift and steering controls in a game, in accordance with one or more implementations.

FIG. 6 illustrates an exemplary diagram of a player interface 80 which provides separate drift and steering controls in a game, in accordance with an aspect of the invention. There may be several platforms in which the game may be implemented. Some platforms may include hardware platforms, operating system platforms and/or software platforms. In some implementations, hardware platforms may include different types of systems in general (e.g., mainframe, workstation, desktop, handheld and/or embedded) and/or the specific type of processor (e.g., x86, SPARC, PowerPC and/or Alpha).

It would be understood by one of ordinary skill in the art that the player interfaces may not be limited to the embodiment illustrated in FIGS. 3-6. The player interfaces may be associated with any objective, activity, action, or a combination thereof.

Although the present technology has been described in detail for the purpose of illustration based on what is currently considered to be the most practical and preferred implementations, it is to be understood that such detail is solely for that purpose and that the technology is not limited to the disclosed implementations but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for facilitating a drifting game mechanic, the system comprising:
one or more physical processors configured by computer readable instruction to:
execute an instance of a game and implement the instance of the game to facilitate user participation in the game that takes place in a virtual space, wherein user participation includes controlling game entities in the virtual space, including a first user that controls a first game entity during participation in the game;
receive entry of steering control inputs from the first user and to cause the first game entity to turn from side to side in accordance with the received steering control inputs;
receive entry of drift control inputs from the first user, wherein the drift control inputs are being input by the first user by tapping on a touch-sensitive surface at a first tapping rate;
determine a target range of tapping rates, wherein tapping on the touch-sensitive surface at a tapping rate within the target range corresponds to target drift control, wherein the target range is between a minimum tapping threshold and a maximum tapping threshold; and
effectuate performance of a drift maneuver by the first game entity causing the first game entity to drift from side to side in accordance with the drift control inputs received from the first user, such that one or more aspects of the drift maneuver at a given point in time are determined based on the first tapping rate and the target range at the given point in time.

2. The system of claim 1, wherein the one or more physical processors are configured by computer-readable instructions such that the one or more aspects of the drifting of the first game entity include a rate of lateral motion of at least a portion of the first game entity during a drift.

3. The system of claim 1, wherein the one or more physical processors are configured by computer-readable instructions such that first game entity is a motorized vehicle, such that the one or more aspects of the drifting of the first game entity include an influence of simulated friction between a wheel of the motorized vehicle and a surface across which the wheel is travelling during a drift.

4. The system of claim 1, wherein the target drift control corresponds to the drift maneuver being performed at a level between under drift and over drift.

5. The system of claim 1, wherein the one or more physical processors are configured to display an indication of the first tapping rate.

6. The system of claim 5, wherein the one or more physical processors are configured by computer-readable instructions to display a target indication representing the target range.

7. The system of claim 5, wherein the one or more physical processors are configured by computer-readable instructions to provide a notification of an accuracy of the first user matching the first tapping rate to the target range.

8. The system of claim 1, wherein the one or more physical processors are configured by computer-readable instructions such that the steering control input comprises one or more of tilting a device, finger swiping on the touch-sensitive surface, or pressing a button on the touch-sensitive device.

9. The system of claim 1, wherein the one or more physical processors are configured by computer-readable instructions to receive entry of a throttle control input, the throttle control input comprising one or more of tilting a device, finger swiping on the touch-sensitive surface, or pressing a button on the touch-sensitive device.

10. The system of claim 1, wherein the one or more physical processors are configured by computer-readable instructions to display an indication of the first tapping rate such that different colors represent the minimum tapping threshold and the maximum tapping threshold.

11. A computer-implemented method for facilitating a drifting game mechanic, the method being implemented in a computer system that includes one or more physical processors configured by computer-readable instructions, the method comprising:
   executing an instance of a game and implementing the instance of the game to facilitate user participation in the game that takes place in a virtual space, wherein user participation includes controlling game entities in the virtual space, including a first user that controls a first game entity during participation in the game;
   receiving entry of steering control inputs from the first user and causing the first game entity to turn from side to side in accordance with the received steering control inputs;
   receiving entry of drift control inputs from the first user, wherein the drift control inputs are being input by the first user by tapping on a touch-sensitive surface at a first tapping rate;
   determining a target range of tapping rates, wherein tapping on the touch-sensitive surface at a tapping rate within the target range corresponds to target drift control, wherein the target range is between a minimum tapping threshold and a maximum tapping threshold; and
   effectuating performance of a drift maneuver by the first game entity causing the first game entity to drift from side to side in accordance with the drift control inputs received from the first user, such that one or more aspects of the drift maneuver at a given point in time are determined based on the first tapping rate and the target range at the given point in time.

12. The method of claim 11, wherein the one or more aspects of the drifting of the first game entity include a rate of lateral motion of at least a portion of the first game entity during a drift.

13. The method of claim 11, wherein the first game entity is a motorized vehicle, such that the one or more aspects of the drifting of the first game entity include an influence of simulated friction between a wheel of the motorized vehicle and a surface across which the wheel is travelling during a drift.

14. The method of claim 11, wherein the target drift control corresponds to the drift maneuver being performed at a level between under drift and over drift.

15. The method of claim 11, wherein the method further comprises displaying an indication of the first tapping rate.

16. The method of claim 15, wherein the method further comprises displaying a target indication representing the target range.

17. The method of claim 15, wherein the method further comprises providing a notification of an accuracy of the first user matching the first tapping rate to the target range.

18. The method of claim 11, wherein the steering control input comprises one or more of tilting a device, finger swiping on the touch-sensitive surface, or pressing a button on the touch-sensitive device.

19. The method of claim 11, additionally comprising receiving entry of a throttle control input, the throttle control input comprising one or more of tilting a device, finger swiping on the touch-sensitive surface, or pressing a button on the touch-sensitive device.

20. The method of claim 11, further comprising displaying an indication of the first tapping rate such that different colors represent the minimum tapping threshold and the maximum tapping threshold.

* * * * *